United States Patent
Hoshi et al.

(10) Patent No.: US 8,907,614 B2
(45) Date of Patent: Dec. 9, 2014

(54) PHOTOVOLTAIC POWER GENERATION SYSTEM

(75) Inventors: Tomohiro Hoshi, Wako (JP); Akira Oshita, Asaka (JP); Noriyuki Ishida, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 932 days.

(21) Appl. No.: 13/069,018

(22) Filed: Mar. 22, 2011

(65) Prior Publication Data

US 2011/0234149 A1    Sep. 29, 2011

(30) Foreign Application Priority Data

Mar. 25, 2010 (JP) ................................ 2010-070024
Mar. 25, 2010 (JP) ................................ 2010-070871

(51) Int. Cl.
| | |
|---|---|
| *H02J 7/00* | (2006.01) |
| *H01M 10/44* | (2006.01) |
| *H01M 10/46* | (2006.01) |
| *B60L 11/18* | (2006.01) |
| *B60L 8/00* | (2006.01) |
| *B62J 19/00* | (2006.01) |

(52) U.S. Cl.
CPC ............ *B60L 11/1824* (2013.01); *B60L 8/003* (2013.01); *B60L 11/1838* (2013.01); *B62J 19/00* (2013.01); *B60L 2230/16* (2013.01); *B60L 2250/10* (2013.01); *B60L 2270/36* (2013.01); *Y02T 10/7005* (2013.01); *Y02T 10/7083* (2013.01); *Y02T 10/7094* (2013.01); *Y02T 90/128* (2013.01); *Y02T 90/14* (2013.01); *Y02T 90/163* (2013.01)
USPC ........................................................ 320/101

(58) Field of Classification Search
USPC ........................................................ 320/101
See application file for complete search history.

(56) References Cited

U.S. PATENT DOCUMENTS

| | | | |
|---|---|---|---|
| 2004/0169489 A1 | 9/2004 | Hobbs | |
| 2008/0143292 A1* | 6/2008 | Ward | ............................ 320/101 |

(Continued)

FOREIGN PATENT DOCUMENTS

| | | |
|---|---|---|
| JP | 6-62503 A | 3/1994 |
| JP | 11-59295 A | 3/1999 |

(Continued)

OTHER PUBLICATIONS

Japanese Office Action dated Oct. 15, 2013, issued in corresponding Japanese Patent Application No. 2010-070871.

(Continued)

*Primary Examiner* — Samuel Berhanu
(74) *Attorney, Agent, or Firm* — Westerman, Hattori, Daniels & Adrian, LLP

(57) ABSTRACT

A photovoltaic power generation system in which an electricity generated by solar cells and a remaining battery level can be checked at once, thus enabling the photovoltaic power generation system to be efficiently operated. The photovoltaic power generation system is provided to charge a battery of a vehicle and is equipped with solar cells for feeding an electromotive force to the battery. The photovoltaic power generation system includes LEDs to make the remaining battery level and the electricity generated by the solar cells visible. Without taking the trouble to prepare a measuring instrument or to push a button of an indicator, a user of the vehicle can immediately check the remaining battery level and the electricity generated by the solar cells by visually checking the display of the LEDs, thus enabling the photovoltaic power generation system to be efficiently operated.

16 Claims, 10 Drawing Sheets

(56) References Cited

U.S. PATENT DOCUMENTS

| | | |
|---|---|---|
| 2010/0017249 A1 | 1/2010 | Fincham et al. |
| 2010/0207764 A1* | 8/2010 | Muhlberger et al. ...... 340/568.1 |

FOREIGN PATENT DOCUMENTS

| | | |
|---|---|---|
| JP | 2000-164906 A | 6/2000 |
| JP | 2006-24636 A | 1/2006 |
| JP | 2006-296134 A | 10/2006 |
| JP | 2006-339504 A | 12/2006 |
| JP | 3129287 U | 2/2007 |
| WO | 2008-079369 A2 | 7/2008 |

OTHER PUBLICATIONS

Extended European Search Report dated Sep. 6, 2011, issued in corresponding European Patent Application No. 11159321.6.

Japanese Office Action dated Jul. 9, 2013 issued in corresponding Japanese Patent Application No. JP2010-070871, (2 pages).

Japanese Office Action dated Jul. 9, 2013 issueed in corresponding Japanese Patent Application No. 2010-070024, (2 pages).

* cited by examiner

PHOTOVOLTAIC POWER GENERATION SYSTEM

BACKGROUND OF THE INVENTION

1. Field of the Invention

The present invention relates to a photovoltaic power generation system incorporated in a vehicle body cover for protecting a vehicle and is provided to charge a battery of the vehicle.

2. Description of the Related Art

As this kind of vehicular photovoltaic power generation system, it has been proposed, e.g., in Japanese examined utility model application publication No. H1-15531, that light receiving surfaces of solar cells are exposed on an outer surface of a vehicle body cover for covering a vehicle to be protected and thereby the electromotive force of the solar cells is supplied to a ventilating device especially when the sun is shining. Such a photovoltaic power generation system is used also to apply auxiliary charge to a battery mounted on, e.g., a two-wheeled vehicle (a saddle-straddling type vehicle) and also is used to feed electric power to parts of the two-wheeled vehicle carrying a secondary battery.

However, the vehicular photovoltaic power generation system according to the conventional art described above has the following problem.

When solar cells are connected with a battery of a vehicle to charge the battery from the solar cells, the electricity of the solar cells and a remaining battery level cannot be known unless a measuring instrument is employed. In this case, a device has been disclosed in which in order to prevent electric power consumption attributable to the use of a measuring instrument, an indicator is incorporated for displaying the remaining battery level by means of LEDs or the like only when a user has pushed a button of the indicator. If a user does not operate the button at all, however, the remaining battery level cannot be checked. Therefore, if the electricity of the solar cells and the remaining battery level cannot be checked at once, the vehicular photovoltaic power generation system cannot be efficiently operated.

Further, when mounting a solar cell panel on a vehicle body cover for covering a vehicle, unlike for usual stationary usage of the solar cells, the solar panel needs to be repeatedly mounted and dismounted, with such a frequency as required for the sake of, e.g., changing the mounted position of the solar cell panel depending on a sunlight direction, in addition to an ordinary need for dismounting and mounting the vehicle body cover itself every time one travel finishes. The solar cell panel is covered with a cover with a housing structure. However, for this reason, more reliable waterproof performance has been sought after for the vehicle body cover.

SUMMARY OF INVENTION

Therefore, with the view of the problem described above, it is an object of the present invention to provide a for making it possible to check at once the electricity generated by the solar cells and a remaining battery level, thereby enabling the photovoltaic power generation system to be efficiently operated.

Besides, it is also an object of the present invention to provide a photovoltaic power generation system which can realize more reliable waterproof performance.

In order to attain the object described above, as a first aspect of the present invention, there is provided a photovoltaic power generation system provided to charge a battery of a vehicle and is equipped with solar cells for feeding electromotive force to the battery. The photovoltaic power generation system is equipped with a display unit for making it possible to view the remaining battery level and the electricity generated by the solar cells.

A second aspect of the present invention is a photovoltaic power generation system in which the display unit comprises a plurality of LEDs each emitting a light beam different in color so that the remaining battery level and the electricity generated by the solar cells are displayed by means of at least one lighted LED selected from among a plurality of the LEDs and a flickering pattern of the at least one lighted LED.

A third aspect of the present invention is a photovoltaic power generation system in which among a plurality of the LEDs, only one LED desirably is lighted individually.

A fourth aspect of the present invention is a photovoltaic power generation system in which instead of the LEDs according to the second aspect, the display unit comprises a single LED composed of a plurality of luminous elements each emitting a light beam different in color. Then, the remaining battery level and the electricity generated by the solar cells are displayed by at least one lighted luminous element selected from among the plurality of the luminous elements and by a flickering pattern of the at least one lighted luminous element.

A fifth aspect of the present invention is a photovoltaic power generation system in which only one luminous element selected from among the plurality of the luminous elements is desirably lighted individually.

A sixth aspect of the present invention is a photovoltaic power generation system which further comprises at least one solar cell module for housing the solar cells therein, and the at least one solar cell pocket provided in a cover for covering the vehicle and the number of which is not less than that of the solar cell modules.

A seventh aspect of the present invention is a photovoltaic power generation system in which an interval between adjacent edges of the solar cell pockets is desirably not less than twice the thickness of the solar cell module.

An eighth aspect of the present invention is a photovoltaic power generation system which further comprises a signal transmitter for delivering a state signal of the photovoltaic power generation system to a security device of the vehicle.

A ninth aspect of the present invention is a photovoltaic power generation system in which the photovoltaic power generation system is equipped with a charge and discharge control circuit for controlling a display state of the display unit and the charge and discharge control circuit controls which of the solar cells and the battery, serving as an electric source, feeds electric power to the signal transmitter.

A tenth aspect of the present invention is a photovoltaic power generation system which comprises a solar cell module, for housing the solar cells therein, that includes a starting-side connector and a terminal-side connector that are electrically connected with the solar cells, and the control module, for hosing the charge and discharge control circuit, that includes a first connector and a second connector that are electrically connected with the charge and discharge control circuit. The first connector of the control module is removably connected with the starting-side connector of the solar cell module and the second connector of the control module is removably connected with the signal transmitter, so that the electromotive force from the solar cells is fed to the signal transmitter via the charge and discharge control circuit.

A eleventh aspect of the present invention is a photovoltaic power generation system in which the signal transmitter is provided in the vehicle, while the solar cell module and the control module are provided in a cover for covering the vehicle.

A twelfth aspect of the present invention is a photovoltaic power generation system which further comprises a terminator removably connected with the terminal-side connector of the solar cell module. There is formed an electric pathway which circulates from the signal transmitter to the terminator via the control module and the solar cells in sequence by connecting the terminator with the terminal-side connector of the solar cell module in a state where the solar cell module and the control module, and the control module and the signal transmitter, are electrically connected with each other. When having detected an interruption of the electric pathway, the signal transmitter delivers the state signal to the security device of the vehicle.

A thirteenth aspect of the present invention is a photovoltaic power generation system in which the solar cell module is at least two so that the solar cells are electrically connected in parallel by connecting the terminal-side connector of one of the at least two solar cell modules with the starting-side connector of the other of the at least two solar cell modules.

A fourteenth aspect of the present invention is a photovoltaic power generation system in which the display unit is allowed to be lighted or flicker full-time.

A fifteenth aspect of the present invention is a photovoltaic power generation system which further desirably includes a cover which houses the solar cells and has sunlight transmission property and waterproof property, and the cover is made of a flexible member produced by integrally five faces of the cover having the form of a substantial hexahedron shape and a transparent plate member fitted into the flexible member.

In this case, the flexible member is made up of a bottom with a receiving portion protruding toward the transparent member and a lateral side which stands up from the periphery of the bottom and has a lip opposed to the receiving portion. A protrusion is formed adjacently to the receiving portion on the underside of the transparent member and then the lip abuts against an upper surface of the transparent member to elastically deform and then the receiving portion abuts against the protrusion to elastically deform, thereby fitting the flexible member into the transparent member.

According to the first aspect of the photovoltaic power generation system, when viewing the display unit, a user can check at once the remaining battery level and the electricity generated by the solar cells without taking the trouble to prepare a measuring instrument and operate a button of an indicator, thus enabling the photovoltaic power generation system to be efficiently operated.

According to the second aspect of the photovoltaic power generation system, LEDs are utilized as a display unit to thereby reduce power consumption attributable to the display unit and besides at least one LED selected from among a plurality of the LEDs is varied in flickering pattern, thereby enabling a display form sensuously easy to view to be realized.

According to the third aspect of the photovoltaic power generation system, only one LED selected from among a plurality of the LEDs each emitting a light beam different in color is varied in flickering pattern to be able to minimize the number of LEDs allowed to be lighted and luminous duration thereof, thereby permitting electric power consumption attributable to the display unit to be minimized.

According to the fourth aspect of the photovoltaic power generation system, the power consumption attributable to the display unit can be reduced by utilizing LEDs as a display unit and besides the flickering pattern of at least one luminous element, which is selected from among luminous elements which make up the single LED and emit light beams of a plurality of colors, thereby enabling a display form sensuously easy to view to be realized.

According to the fifth aspect of the photovoltaic power generation system, only one luminous element selected from among the plurality of luminous elements each emitting a light beam different in color is varied in flickering pattern to be able to minimize the number of luminous elements allowed to be lighted and luminous duration thereof, thereby permitting electric power consumption to be minimized.

According to the sixth aspect of the photovoltaic power generation system, a required number of the solar cell module can be mounted in the solar cell pockets provided in a cover for a vehicle, depending on the characteristics of the vehicle and the capacity of the battery. In this case, while checking the remaining battery level and the electricity generated by the solar cells by the display unit, a position of the solar cell pocket in which the solar cell module are mounted can be selected, too.

According to the seventh aspect of the photovoltaic power generation system, the solar cells can be modulized to be reduced in size by means of a solar cell module making it possible to house a plurality of the solar cell modules in the solar cell pockets at given intervals therebetween. Further, the solar cell modules are divided into a small-sized one and are separate from each other at intervals not less than twice the thickness of the solar cell module. Hence, the cover can be compactly folded without taking the solar cell modules out of the cover.

According to the eighth aspect of the photovoltaic power generation system, not only when the theft of the vehicle occurs but when part of or the whole of the photovoltaic power generation system is conspired to steal, these thefts can be prevented by means of the state signal of the photovoltaic power generation system, applied to the security device. By interlocking the photovoltaic power generation system with the existing vehicular antitheft security device, the need for providing a new security device used exclusively for the photovoltaic power generation system is eliminated, thus enabling an antitheft function to be added with a minimum necessary scale.

According to the ninth aspect of the photovoltaic power generation system, the charge and discharge control circuit not only monitors the states of the solar cells and battery to merely control the display state of the display unit but also can control an electric source to be fed to the signal transmitter.

According to the tenth aspect of the photovoltaic power generation system, only by connecting the starting-side connector of the solar cell module with the first connector of the control module and the signal transmitter with the second connector of the control module, the electromotive force can be fed from the solar cells to the signal transmitter. Further, if need arises, the solar cells of a different solar cell module can be easily connected with the charge and discharge control circuit.

According to the eleventh aspect of the photovoltaic power generation system, by disconnecting the second connector of the control module and the signal transmitter, the cover covering the vehicle can be immediately dismounted without being subjected to the interference of electric connection due to this photovoltaic power generation system.

According to the twelfth aspect of the photovoltaic power generation system, when the second connector of the control module and the signal transmitter have been disconnected from each other, the state signal is delivered from the signal transmitter to the security device of the vehicle. Hence, security information can be delivered before a suspicious individual accesses the vehicle body.

According to the thirteenth aspect of the photovoltaic power generation system, only by connecting the terminal-side connector, removable from the terminator, of one solar cell module and the starting-side connector, removable from the first connector of the control module, of the other solar cell module, the two solar cells can be parallel-connected without uselessly increasing the number of a connector of the solar cell module.

According to the fourteenth aspect of the photovoltaic power generation system, the display unit is allowed to light or flicker invariably during the daytime and the nighttime, thereby enabling an antitheft effect to be obtained.

According to the fifteenth aspect of the photovoltaic power generation system, no heat is required which is usually used for bonding, welding, screw fastening, or integral molding, in the assembling process of the cover. Only by fitting the transparent member into the flexible member, it becomes possible to realize more secure waterproof performance of the cover for the solar cells with the flexible member ensured in terms of flexibility. In this case, a structure with a small number of components can be realized due to using the transparent member and the flexible member for forming the cover, while making it possible to simplify the management of the assembling process of the cover.

According to the sixteenth aspect of the photovoltaic power generation system, the receiving portion of the flexible member is allowed to come in close contact with the protrusion of the transparent member to thereby vertically sandwich the transparent member, below a position where the lip contacts with the transparent member, thus realizing the close contact of the lip with the upper face of the transparent member that particularly requires sufficient waterproof performance as well as the water-proofing performance to the inside of the cover at the same time.

BRIEF DESCRIPTION OF THE DRAWING

The invention will be more readily understood by reference to the following description, taken with the accompanying drawings, in which.

DESCRIPTION OF THE PREFERRED EMBODIMENTS

Hereunder is a description of embodiments of a photovoltaic power generation system proposed in the present invention with reference to accompanying drawings.

Figure 1:
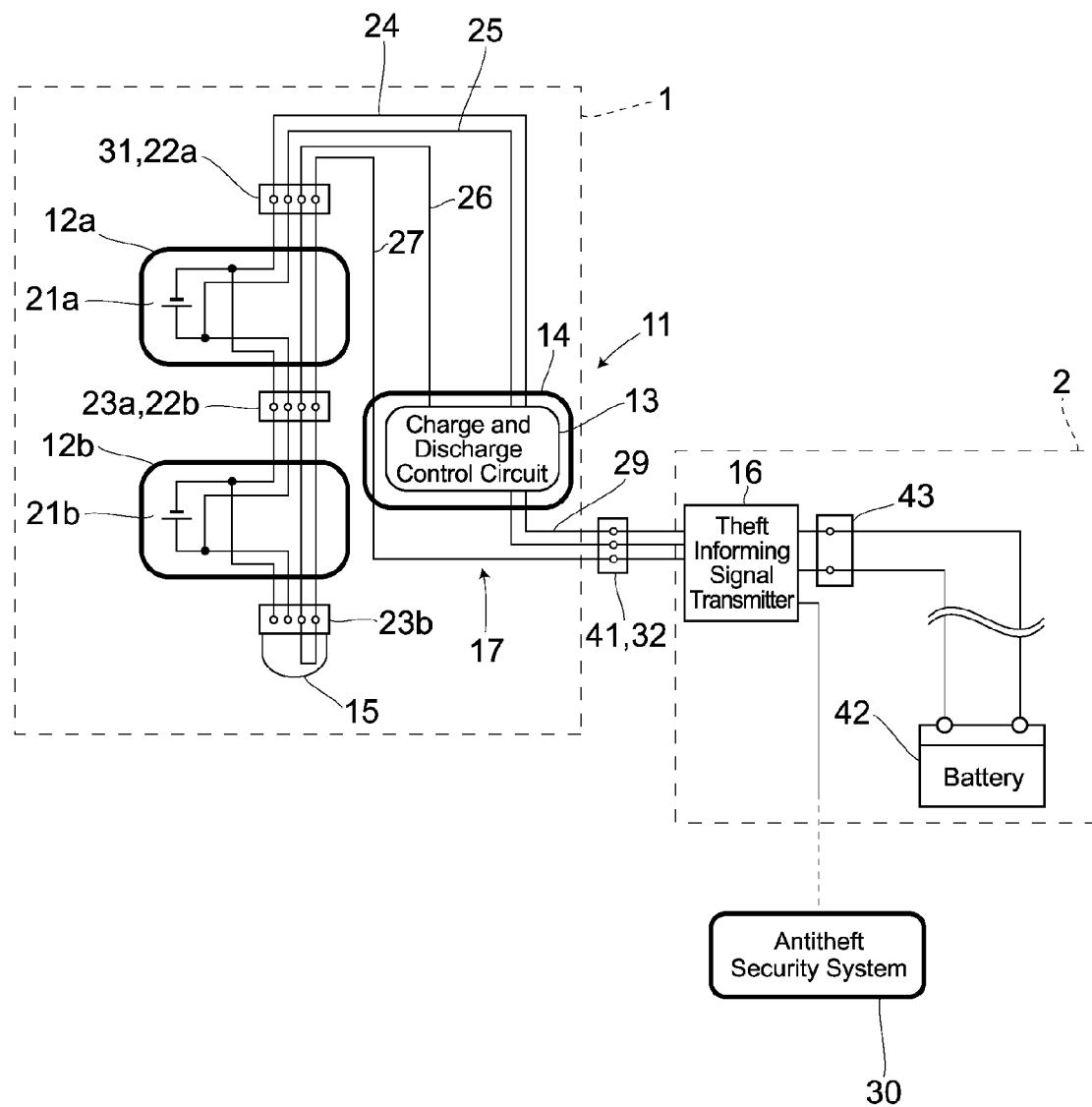
FIG. 1 is a circuit diagram of an electric component section illustrating a first embodiment 1 of the present invention.

First, in a first embodiment of the present invention, a configuration of an electric component mounted section including a harness is described based on FIG. 1. Numeral symbol 1 denotes a protective vehicle body cover for covering a two-wheeled vehicle, being a vehicle, and numeral symbol 2 denotes a vehicular outline of the two-wheeled vehicle (hereunder, simply referred to as a vehicle 2). Within the vehicle body cover 1, the photovoltaic power generation system 11 according to the present invention is provided with solar panel modules 12a, 12b a plurality of which is connectable, a control module 14 including a charge and discharge control circuit 13 acting as an electric controller, and a terminator 15 connected with a terminal end of the solar panel module 12b. At the same time, a theft informing signal transmitter 16 is provided within the vehicle 2. These solar panel modules 12a, 12b; the control module 14; the terminator 15 acting as a terminal device; and the theft informing signal transmitter 16 are electrically connected with one another by a harness 17 acting as an interconnector.

The solar panel module 12a corresponding to a solar cell module is incorporated with a solar cell 21a for converting optical energy to electric power and is equipped with connectors 22a, 23a, acting as an external connector, for enabling the electrical connection with other devices. Further, a first power wire 24 connected with a negative terminal of the solar cell 21a is connected with a first terminal of the connector 22a and a first terminal of the connector 23a. A second power wire 25 connected with a positive terminal of the solar cell 21a is connected with a second terminal of the connector 22a and a second terminal of the connector 23a. A first signal wire 26 for security is connected with a third terminal of the connector 22a and a third terminal of the connector 23a. Further, a second signal wire 27 for security is connected with a fourth terminal of the connector 22a and a fourth terminal of the connector 23a.

In a similar fashion, another solar panel module 12b forms the same configuration as that of the solar panel module 12a and is incorporated with the solar cell 21b and further is equipped with connectors 22b, 23b. Then, the power wire 24 connected with a negative terminal of the solar cell 21b is connected with a first terminal of the connector 22b and a first terminal of the connector 23b. The power wire 25 connected with a positive terminal of the solar cell 21b is connected with a second terminal of the connector 22b and a second terminal of the connector 23b. The signal wire 26 for security is connected with a third terminal of the connector 22b and a third terminal of the connector 23b. Further, the signal wire 27 for security is connected with a fourth terminal of the connector 22b and a fourth terminal of the connector 23b.

In addition, in FIG. 1, the two solar panel modules 12a, 12b are shown. The number of the solar panel modules, however, is not particularly limited.

The control module 14 is equipped with connectors 31, 32 acting as an external connector in addition to the charge and discharge control circuit 13 described above. A first connector 31 has a shape connectable with the connectors 22a, 22b on the starting side of the solar panel modules 12a, 12b and the power wire 24 is connected with a first terminal of the connector 31, the power wire 25 is connected with a second terminal thereof, the signal wire 26 is connected with a third terminal thereof, and the signal wire 27 is connected with a fourth terminal thereof. The power wires 24, 25 and the signal wire 26 are connected with the charge and discharge control circuit 13, and the power wire 24 and the signal wire 26 are connected with a first terminal of a second connector 32 as a common line 29 which is at the same potential level and is grounded. Furthermore, the power wire 25 from the charge and discharge control circuit 13 is connected with a second terminal of the connector 32 and a signal wire 27 from a fourth terminal of the connector 31 is connected directly with a third terminal of the connector 32 not via the charge and discharge control circuit 13.

Therefore, by connecting the connector 23a on the terminal side of the solar panel module 12a and the connector 22b on the starting side of the solar panel module 12b, the solar panel modules 12a, 12b are electrically connected with each other to thereby parallel-connect the solar cell 21a of the solar panel module 12a and the solar cell 21b of the solar panel modules 12b. In this state, by connecting the connector 22a on the starting side of the solar panel module 12a and the connector 31 of the control module 14, the solar panel modules 12a, 12b and the control module 14 are electrically connected, so that the electromotive force from each of the solar cells 21a, 21b is fed to the charge and discharge control circuit 13 via the power wires 24, 25.

The terminator 15 is intended to short-circuit the signal wires 26, 27 on the terminal side of the solar panel module 12b. With the solar panel modules 12a, 12b electrically connected with the control module 14, when connecting the terminator 15 with the connector 23b of the solar panel module 12b, the third and fourth terminals of the connector 23b are electrically connected to form an electric circuit in a looped manner in each of the components from the connector 32 connected with the theft informing signal transmitter 16 to the terminator 15 sequentially via the control module 14 and then the solar panel modules 12a, 12b.

The theft informing signal transmitter 16 is equipped with a connector 41 connectable with the connector 32 and a connector 43 connectable with the two-wheeled vehicle's battery 42 mounted within the vehicle 2. Thus, the theft informing signal transmitter 16 receives electric power from the solar panel modules 12a, 12b or the battery 42 to operate. Here, the theft informing signal transmitter 16 monitors the looped electric circuit formed by the signal wires 26, 27 and the terminator 15. When having detected that this looped electric circuit had been interrupted, the theft informing signal transmitter 16 delivers a theft informing signal to, e.g., a spy ball terminal of the two-wheeled vehicle's antitheft security system 30 for detecting whether each part of the two-wheeled vehicle has been stolen or not. As a result, an alarm is set off from the two-wheeled vehicle antitheft security system 30.

Next, the outline structure of the control module 14 is described with reference to FIG. 2 and FIG. 3. In these FIGS. 2, 3, numeral symbol 51 denotes a flat boxy case for forming its outer shell and numeral symbols 52, 53, 54 denote LEDs (Light-Emitting Diodes), acting as a display unit provided on an upper surface of the case 51 and the above connectors 31, 32 are arranged side by side on the lateral side of the case 51. Further, the charge and discharge control circuit 13 described above, not shown here, is housed within the case 51 to be electrically connected with the connectors 31, 32 and the LEDs 52, 53, 54.

Figure 2:
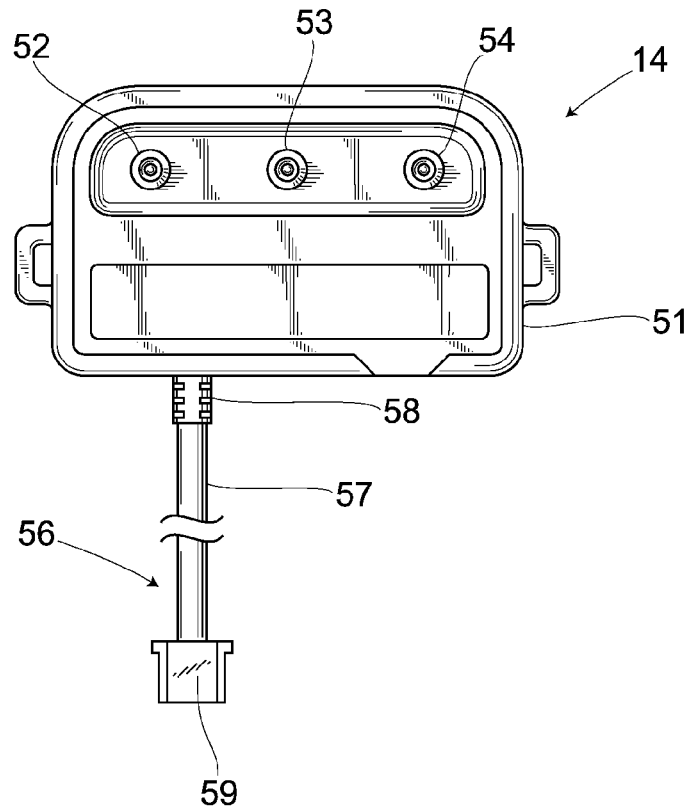
FIG. 2 is a plain view illustrating a condition in which a relay unit is connected with a control module in the first embodiment 1 of the present invention.
Figure 3:
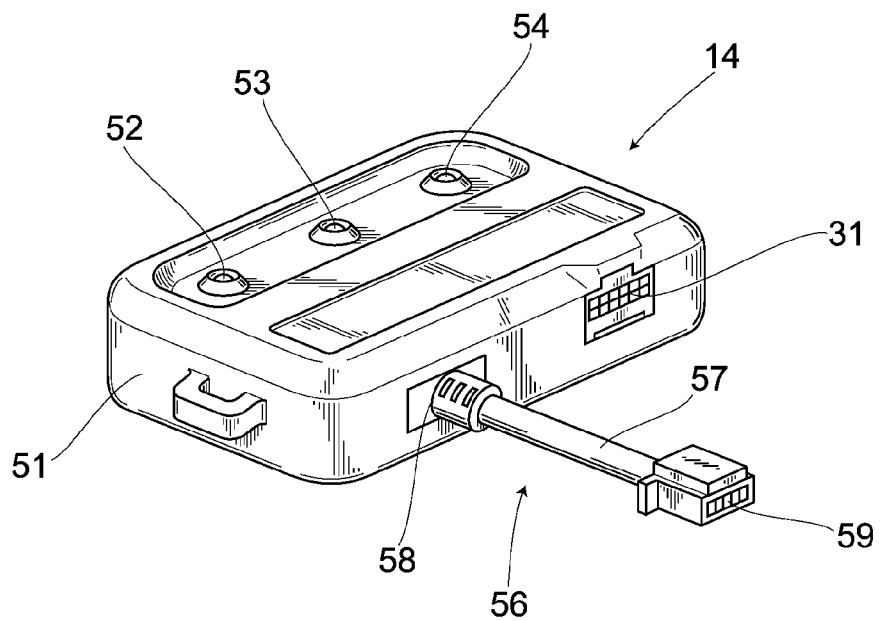
FIG. 3 is a perspective view illustrating the condition in which the relay unit is connected with the control module in the first embodiment 1 of the present invention.
Figure 4:
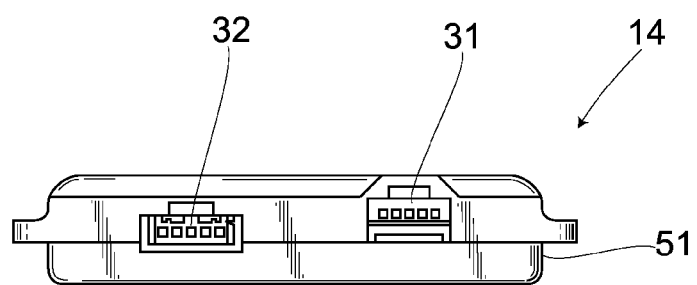
FIG. 4 is a front view of a control unit in the first embodiment 1 of the present invention.
Figure 5:
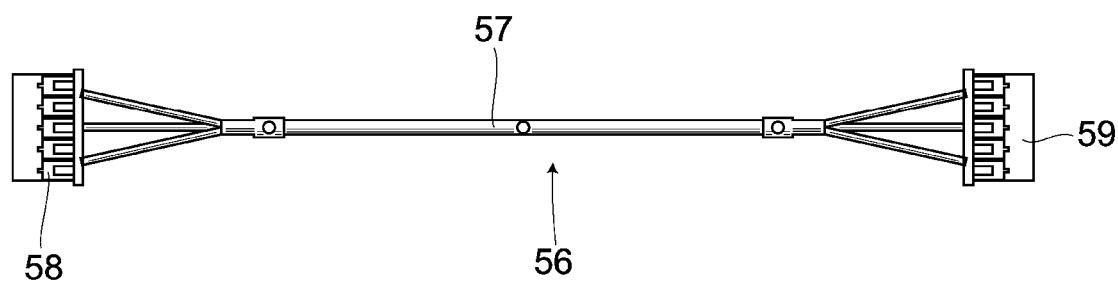
FIG. 5 is a plain view of the relay unit in the first embodiment 1 of the present invention.

In FIG. 2 and FIG. 3, shown is a relay unit 56 for connecting the connector 31 of the control module 14 and the connector 41 of the theft informing signal transmitter 16. In an external appearance of a single body of the relay unit 56 as shown in FIG. 5, a male coupler 58 and a female coupler 59 are connected with one end and the other end of a cable 57, respectively, comprising the power wire 25, the signal wire 27, and the common wire 29. Then, between the vehicle body cover 1 and the vehicle 2 which are separately-placed from each other, the male coupler 58 of the relay unit 56 is connected with a female connector 32 of the control module 14, while the female coupler 59 of the relay unit 56 is connected with the male connector 41 of the theft informing signal transmitter 16.

Returning to FIG. 2 and FIG. 3 again, each of the LEDs 52, 53, 54 has a different luminescent-color element. Here, as an example, a first LED 52 has a green luminescent color, a second LED 53 has a yellow luminescent color, and a third LED 54 has a red luminescent color. The charge and discharge control circuit 13 monitors the charged amount of the battery 42 from the voltage across the battery 42 and further monitors the electricity generated by the solar panel modules 12a, 12b from the voltage across the solar cells 21a, 21b parallel-connected with each other. The charge and discharge control circuit 13 has a function to control the display state of each of the LEDs 52, 53, 54, based on the results monitored. Depending on the charged amount of the battery 42, the charge and discharge control circuit 13 selects one LED, e.g., the LED 53 to be lit. Then, the charge and discharge control circuit 13 delivers a display control signal required for each of the LEDs 52, 53, 54 so that a flickering interval is allowed to continuously vary in the LED 53 selected, depending on the electricity generated by the solar panel modules 12a, 12b. Here, as the charged amount of the battery 42 increases, the LEDs are selected in the order corresponding to the LED 52→LED 53→LED 54 to light the LEDs in that order, and then as the electricity generated by the solar panel modules 12a, 12b increases, the flickering interval of one LED selected, e.g., the LED 53 is allowed to gradually become short. Accordingly, the flickering LEDs 52, 53, 54 are limited to only one LED to attain electric power saving and further a display form sensuously easy to view can be realized.

Figure 6:
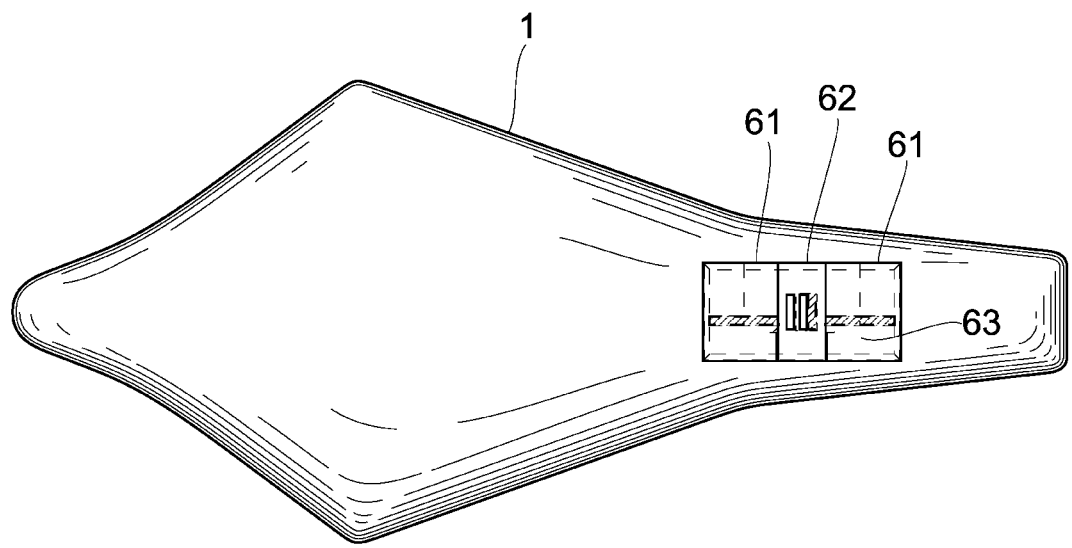
FIG. 6 is a plan view of a cover in the first embodiment 1 of the present invention.
Figure 7:
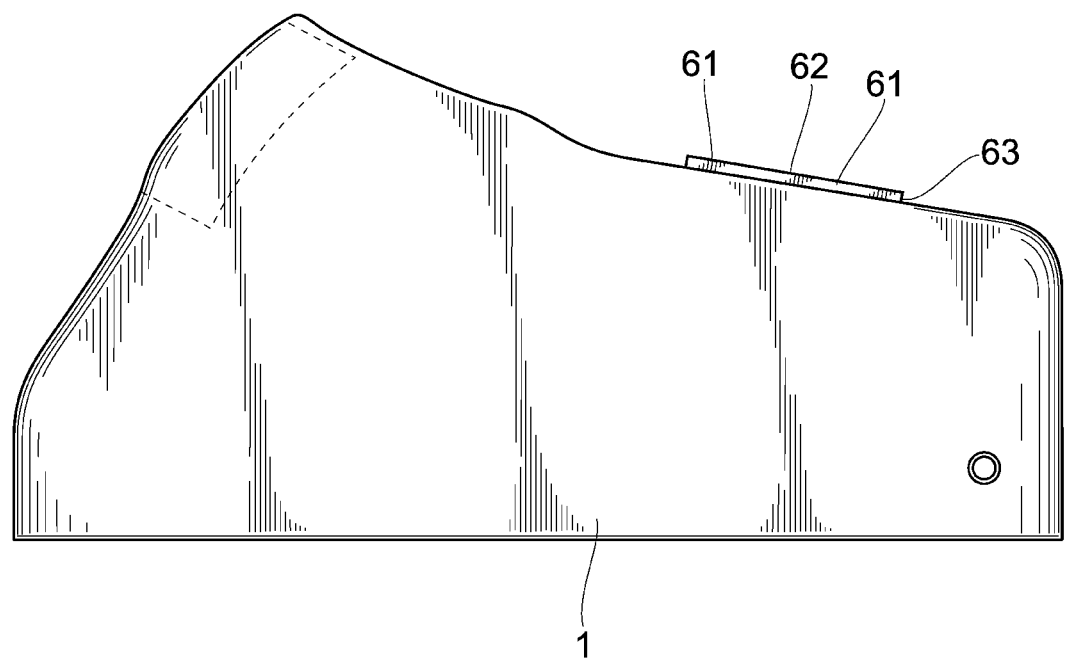
FIG. 7 is a side view of the cover in the first embodiment 1 of the present invention.

FIG. 6 and FIG. 7 show an external appearance of the vehicle body cover 1. In each of FIG. 6 and FIG. 7, the vehicle body cover 1 is stream-lined in such a fashion as to cover the whole of the two-wheeled vehicle not shown.

A first housing section 61 for housing the solar panel modules 12a, 12b and a second housing section 62 for housing the control module 14 are provided side by side on the upper surface of the vehicle body cover 1 at a position corresponding to a seat of the two-wheeled vehicle. The housing sections 61 are provided on both sides of the housing section 62 in the front-back direction thereof. Here, one housing section 61 is equipped with two pockets (not shown) for housing the solar panel modules 12a, 12b. The housing section 62 is equipped with one pocket (not shown) for housing one control module 14. The number of the solar panel modules 12a, 12b to be mounted can be varied according to a vehicle and it is desirable that, e.g., one module is mounted on a small-sized vehicle and two modules are mounted on a large-sized vehicle. Accordingly, in both the vehicles, within the total two housing sections 61, an empty pocket can be secured in which the solar panel modules 12a, 12b are not mounted. Therefore, a housing pocket for housing one or two solar panel modules 12a, 12b can be arbitrarily selected within these housing sections 61. Accordingly, depending on an irradiation angle of sunlight and a placed position of the vehicle body cover 1, the housing positions of the solar panel modules 12a, 12b can be varied, thus permitting the electricity generated by the solar panel modules 12a, 12b to be efficiently increased.

Further, the upper sides of the housing sections 61, 62 are composed of transparent vinyl pieces, while the periphery of the underside thereof is composed of a nonwaterproof sewn body 63 with an opening for taking out and putting in. Upper openings of the housing sections 61, 62 are covered with a plurality of transparent vinyl pieces. By making the upper sides of the housing sections 61, 62 using the transparent member, light can be let in to the solar panel modules 12a, 12b through the transparent member with the upper openings of the housing sections 61, 62, closed.

Figure 8:
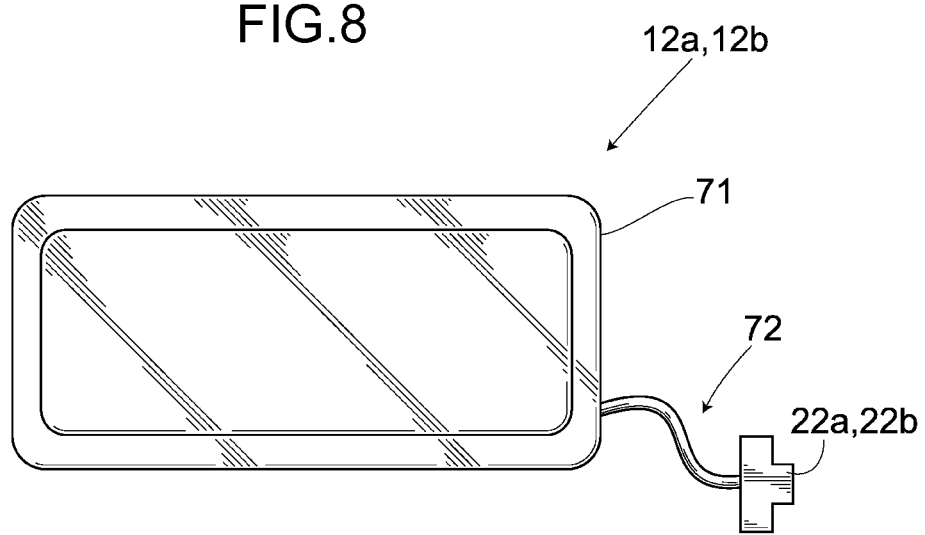
FIG. 8 is a plain view of a solar panel module in the first embodiment 1 of the present invention.

FIG. 8 shows an external appearance of each of the solar panel modules 12a, 12b. Both of the solar panel modules 12a, 12b are shaped the same and each comprises a flat and boxy module main body 71 forming its outer shell and an interconnection unit 72 extending from the module main body 71. The solar cells 21a, 21b are arranged within the module main body 71 and when light is irradiated to the solar cells 21a, 21b through the module main body 71, electromotive force is generated from the solar cells 21a, 21b. The interconnection unit 72 constitutes part of the above harness 17 and is provided with connectors 22a, 22b in its extremity. The solar panel modules 12a, 12b are electrically connected with each other by this interconnection unit 72, making it possible to connect a plurality of the solar panel modules 12a, 12b according to need. In addition, not shown here, other connectors 23a, 23b connected with the connectors 22a, 22b are provided on, e.g., a lateral side and bottom surface of the module main body 71.

Figure 9:
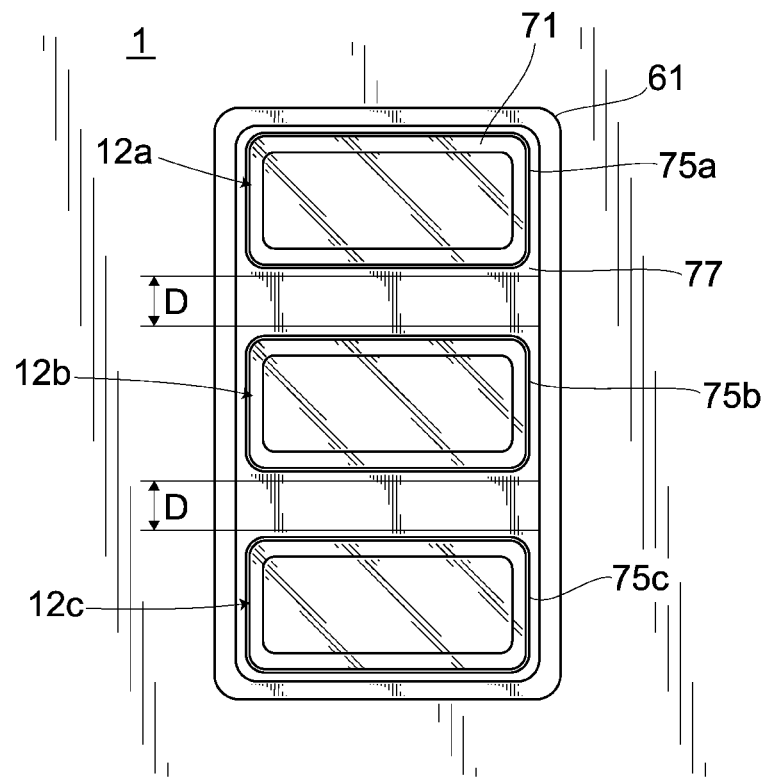
FIG. 9 is a plain view of a main part illustrating a condition in which the solar panel module is mounted in the first embodiment 1 of the present invention.
Figure 10:
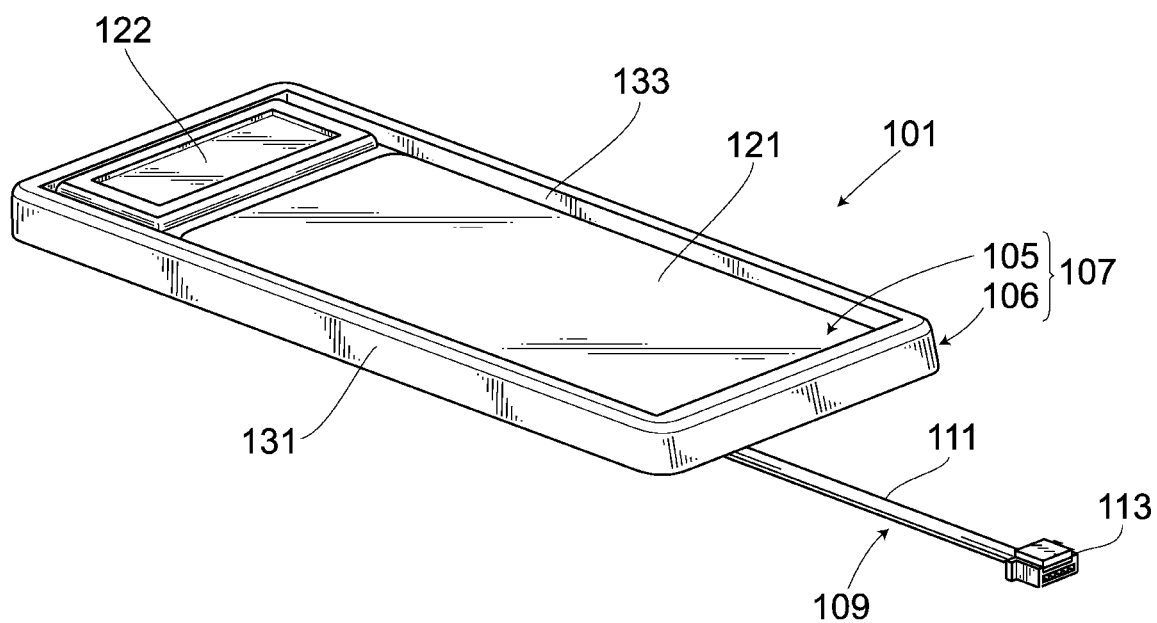
FIG. 10 is a perspective view of a solar cell module illustrating a second embodiment of the present invention.
Figure 11:
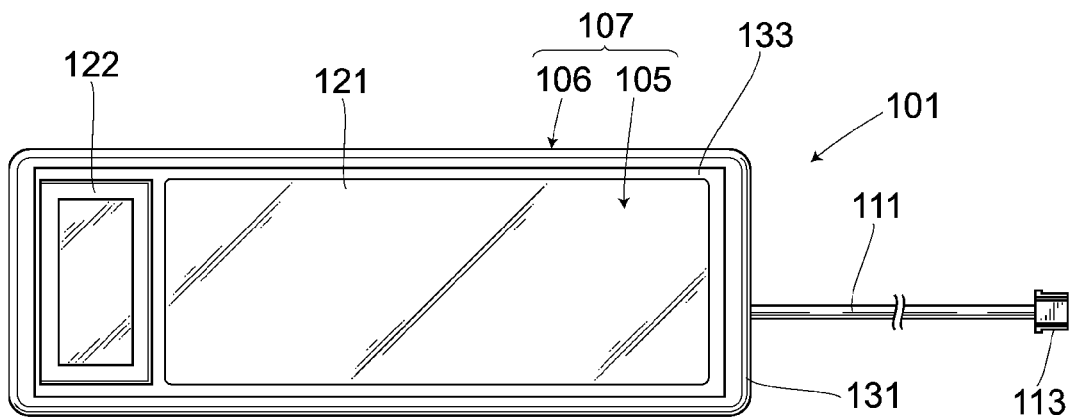
FIG. 11 is a plain view of the solar cell module illustrating the second embodiment of the present invention.
Figure 12:
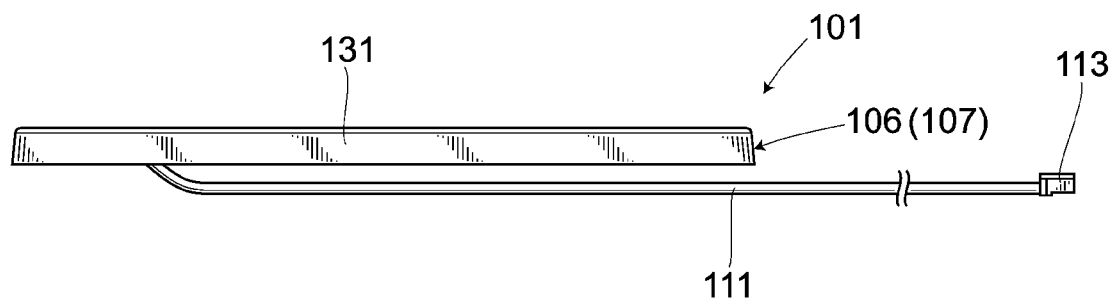
FIG. 12 is a front view of the solar cell module illustrating the second embodiment of the present invention.
Figure 13:
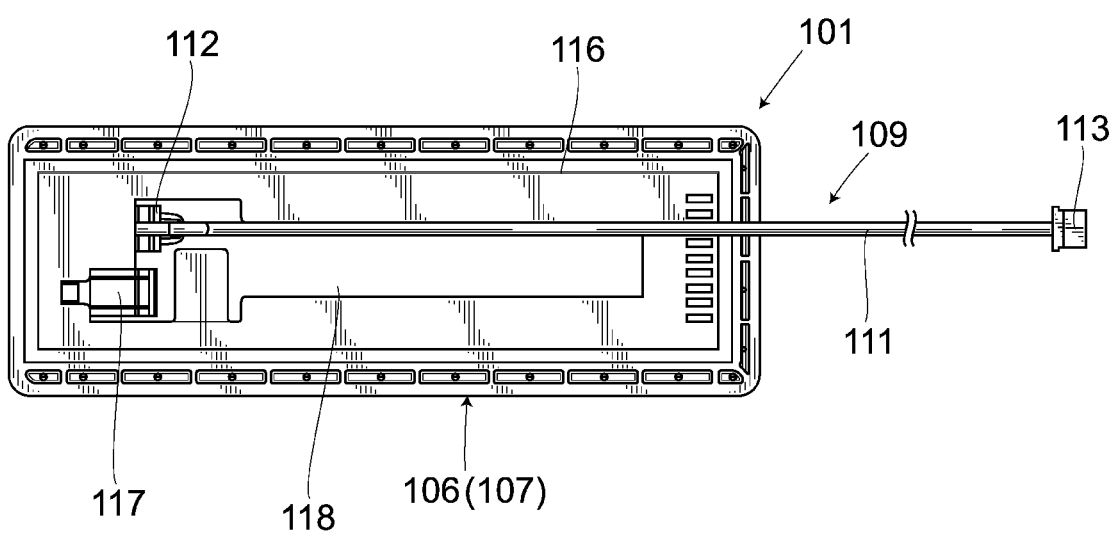
FIG. 13 is a bottom view of the solar cell module illustrating the second embodiment of the present invention.
Figure 14:
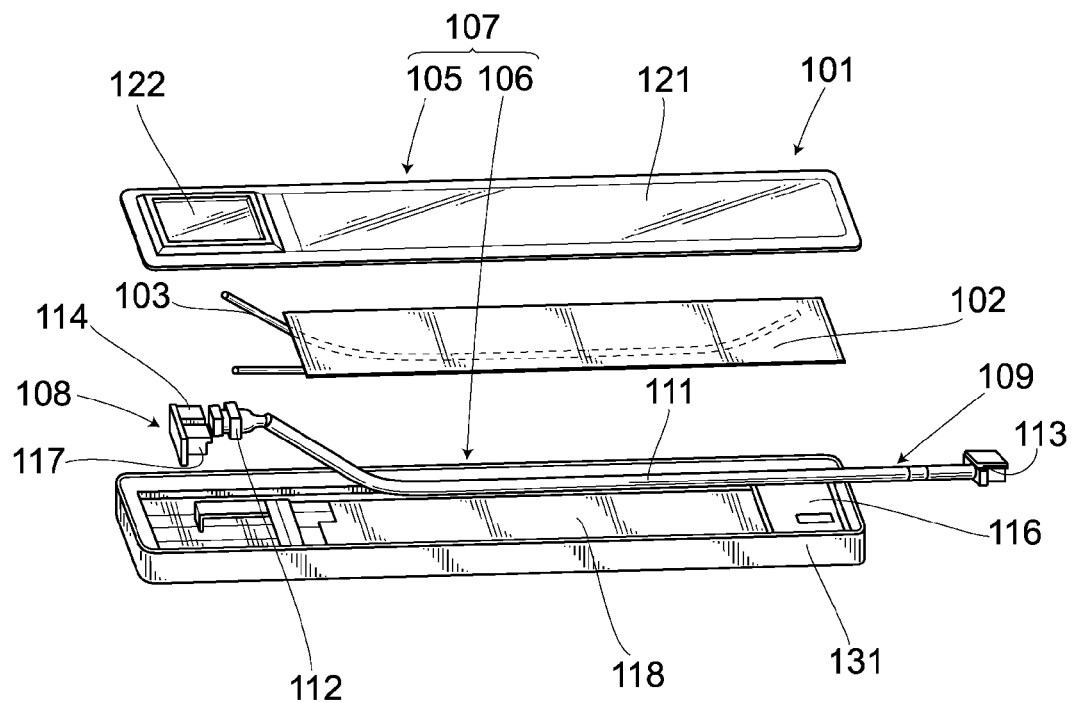
FIG. 14 is an exploded perspective view of the solar cell module illustrating the second embodiment of the present invention.

FIG. 9 shows the housing section 61 which has housed the solar panel modules 12a, 12b shown in FIG. 8. In FIG. 9, three pockets 75a, 75b, 75c are provided side by side in one housing section 61, and then up to three solar panel modules 12a, 12b, 12c can be housed corresponding to these pockets 75a, 75b, 75c. On the surfaces of the pockets 75a, 75b, 75c, a clear raw material 77 acting as the above transparent member is provided in an openable and closable manner.

As described above, the number of the solar panel modules 12a, 12b, 12c housed within the housing section 61 can be varied depending on a vehicle type including vehicular characteristics and the capacity of the battery 42. When the number of the solar panel modules 12a, 12b, 12c to be housed is smaller than the number of the pockets 75a, 75b, 75c, one solar panel module 12a, e.g., can be housed within any one of the pockets 75a, 75b, 75c and by changing a housing position of the solar panel module 12a, the electricity generated by the solar panel module 12a can be efficiently increased. Here, the structure of the solar panel module 12c is the same as those of the solar panel modules 12a, 12b.

Each of the intervals D between the adjacent pockets 75a, 75b and between the adjacent pockets 75b, 75c is formed in a size not less than twice the thickness of each of the solar panel modules 12a, 12b, 12c. Accordingly, the solar cells 21a, 21b, 21c are compactly modularized by means of the solar panel modules 12a, 12b, 12c, thus enabling a plurality of the solar cells 21a, 21b, 21c to be housed at interval D from one another within the pockets 75a, 75b, 75c. Further, the solar panel modules 12a, 12b, 12c are divided into small ones and are separated at the interval D. Hence the vehicle body cover 1 can be also compactly folded up without taking the solar panel modules 12a, 12b, 12c out of the vehicle body cover 1.

Furthermore, if the housing section 61 itself is not provided with waterproof performance, by providing the solar panel modules 12a, 12b, 12c with waterproof performance, the waterproof performance of the electric component mounted section including the solar cells 21a, 21b, 21c can be enhanced.

Next, the behavior of the above scheme is described. When using the photovoltaic power generation system 11 in the present embodiment, a required number of the solar panel modules 12a, 12b, 12c are mounted in the pockets 75a, 75b, 75c of the housing section 61 provided in the vehicle body cover 1. Then, the control module 14 is mounted in another housing section 62 to sequentially connect the solar panel modules 12a, 12b, 12c and the control module 14 using the harness 17. Further, the control module 14 mounted on the vehicle body cover 1 and the theft informing signal transmitter 16 provided in the vehicle are also mutually connected using the harness 17. Then, both the electric power generated in the solar panel modules 12a, 12b, 12c by irradiating sunlight to each of the solar cells 21a, 21b, 21c and the electric power output from the battery 42 are utilized in the daytime, while the electric power output from the battery 42 is utilized in the nighttime. Consequently, the photovoltaic power generation system 11 is allowed to operate for 24 hours, thus enabling the electric power consumption of the battery 42 to be reduced extremely to a low level. Furthermore, by feeding the electromotive force from each of the solar cells 21a, 21b, 21c to the battery 42, the auxiliary charge can be applied to the battery 42 in the daytime, too.

Further, for the sake of preventing the photovoltaic power generation system 11 from being stolen, as shown in FIG. 1, the terminator 15 is mounted on the connector 23b of the solar panel module 12b not connected with the control module 14 and another solar panel module 12a to actuate the theft informing signal transmitter 16 and the antitheft security system 30, which are provided on the vehicle. By mounting the terminator 15 on the connector 23b, a looped electric circuit is formed in each of the components ranging from the connector 32 connected with the theft informing signal transmitter 16 to the terminator 15 via the control module 14 and the solar panel module 12a, 12b. At this time, the charge and discharge control circuit 13 controls which electric source is used, the solar cells 21a, 21b incorporated in the photovoltaic power generation system 11 or the battery 42 incorporated in the vehicle, thus feeding currents to the signal wires 26, 27 for security.

Here, when any of the connectors 32, 41; the connectors 22a, 31; the connectors 22b, 23a; the connector 23b and the terminator 15, which are connected to the components mounted in the photovoltaic power generation system 11, are disconnected for the purpose of dismounting part of or the whole of the photovoltaic power generation system 11 from the vehicle body cover 1, the theft informing signal transmitter 16 detects the disconnection of the looped electric pathway from the interruption of the currents flowing through the signal wires 26, 27. At this time, the theft informing signal is delivered from the theft informing signal transmitter 16 to the antitheft security system 30 to cause an alarm to be set off from the antitheft security system 30. In the present embodiment in particular, the photovoltaic power generation system 11 is incorporated in the vehicle body cover 1 and hence at the instant of having disconnected the connectors 32, 41 in order to dismount the vehicle body cover 1 from the vehicle, an alarm is set off to permit information for security to be notified before a suspicious individual accesses the vehicle body. Further, only by forming the electric pathway through each of the above components in the photovoltaic power generation system 11, the existing antitheft security system 30 is utilized to allow an antitheft function of the photovoltaic power generation system 11 to be effectively realized.

At the same time, the charge and discharge control circuit 13 incorporated in the control module 14 monitors the charged amount of the battery 42 from the voltage across the battery 42, which is generated between the power wire 25 and the common line 29 and further monitors the electricity generated by the solar panel modules 12a, 12b from the voltage across the solar cells 21a, 21b, which is generated between the power wires 24, 25. Then, depending on the charged amount of the battery 42, the charge and discharge control circuit 13 selects one LED, e.g., the LED 53 to be lit to allow the selected LED 53 to flicker at a flickering interval depending on the electricity generated by the solar panel module 12a, 12b, thus lighting any one of the LEDs full-time or on and off.

Thus, by viewing the display state of the LEDs 52, 53, 54 lighting or flickering full-time or on and off, a user need not bother to prepare a measuring instrument to be able to check at once the electricity generated by the solar panel modules 12a, 12b and the charged amount of the battery 42. Hence, for example, a user can perceive the lowering of the remaining level of the battery 42 before the battery 42 runs out. Further, one of the LEDs 52, 53, 54 invariably lights (flickers) even during nighttime and hence an antitheft effect can be obtained also in this regard.

As described above, the photovoltaic power generation system 11 in the present embodiment is provided to charge the battery 42 acting as a vehicular electric source and is equipped with the solar cells 21a, 21b, 21c for feeding electromotive force to the battery 42. The photovoltaic power generation system 11 is equipped with, e.g., the LEDs 52, 53, 54 acting as a display unit by which the remaining level of the battery 42 and the electricity generated by the solar cells 21a, 21b, 21c are visible.

Consequently, by viewing the display state of the LEDs 52, 53, 54 acting as a display unit, a vehicular user can check at once the remaining level of the battery 42 and the electricity generated by the solar cells 21a, 21b, 21c without taking the trouble to prepare a measuring instrument and operating a button of an indicator. Hence, the photovoltaic power generation system 11 can efficiently operated.

Further, particularly when the display unit is equipped with a plurality of the LEDs 52, 53, 54, acting as a display unit, capable of each emitting a light beam different in color, the remaining level of the battery 42 and the electricity generated by the solar cells 21a, 21b, 21c can be displayed by means of the flickering pattern of at least one LED allowed to light from among a plurality of LEDs 52, 53, 54.

Accordingly, the LEDs 52, 53, 54 are employed as a display unit to thereby reduce electric power consumption attributable to the display unit, and besides at least one LED selected from among a plurality of the LEDs 52, 53, 54 capable of each emitting a light beam different in color is allowed to vary in flickering pattern, thereby permitting a display form sensuously easy to view to be realized.

Further, in the present embodiment, only one LED individually lights from among a plurality of the LEDs 52, 53, 54. Consequently, only one LED selected from among a plurality of the LEDs 52, 53, 54 each emitting a light beam different in color, e.g., the LED 53 is allowed to vary in flickering pattern to minimize the number of LEDs allowed to light and its luminescent duration, thus permitting the electric power consumption attributable to the display unit to be minimized.

In the present embodiment, the photovoltaic power generation system 11 is equipped with the solar panel modules 12a, 12b, 12c which house the solar cells 21a, 21b, 21c and act as at least one solar cell panel, and the solar cell pockets 75a, 75b, 75c which are provided in the vehicle body cover 1 acting as the cover for covering the vehicle and the number of which is not less than that of the solar panel modules 12a, 12b, 12c.

In this case, according to the characteristics of the vehicle and the capacity of the battery 42, a required number of the solar panel modules 12a, 12b, 12c can be mounted in the pockets 75a, 75b, 76c provided in the vehicle body cover 1. Further, in this case, while checking the remaining level of the battery 42 and the electricity generated by the solar cells 21a, 21b, 21c, any pockets within which the solar panel modules 12a, 12b, 12c are mounted can be selected from among the pockets 75a, 75b, 75c, too.

Furthermore, in the present embodiment, each of intervals D between the edges of the adjacent pockets 75a, 75b and between those of the adjacent pockets 75b, 75c is formed in a size equal to or more than twice each of the widths of the solar panel modules 12a, 12b, 12c. Accordingly, the solar cells 21a, 21b, 21c are compactly modularized by means of the solar panel modules 12a, 12b, 12c and a plurality of the solar panel modules 12a, 12b, 12c can be housed within the pockets 75a, 75b, 75c separately at a given interval D. Further, the edges of the pockets 75a, 75b, 75c are separated equally to or more than twice each of the thicknesses of the solar panel modules 12a, 12b, 12c. Hence, the vehicle body cover 1 can be compactly folded without taking the solar panel modules 12a, 12b, 12c out of the vehicle body cover 1.

Moreover, in the present embodiment, the photovoltaic power generation system 11 is equipped with the theft informing signal transmitter 16, as a signal transmitter for delivering the theft informing signal, being a state signal of the photovoltaic power generation system 11, to the antitheft security system 30 acting as an antitheft security system of the vehicle. Hence, not only when a vehicle theft has occurred but also when part of or the whole of the photovoltaic power generation system 11 is conspired to steal, these thefts can be prevented by the theft informing signal of the photovoltaic power generation system 11, which is fed to the antitheft security system 30. Further, by interlocking the photovoltaic power generation system 11 with the existing antitheft security system 30, no security device dedicated for the photovoltaic power generation system 11 is needed, enabling an antitheft function to be added with a minimum necessary system.

Further, in the present embodiment, the photovoltaic power generation system 11 is equipped with the charge and discharge control circuit 13 for controlling the display state of the LEDs 52, 53, 54. The charge and discharge control circuit 13 controls which of the solar cells 21a, 21b, 21c and the battery 42, serving as an electric source, feeds electric power to the theft informing signal transmitter 16. As a result, by monitoring the states of the solar cells 21a, 21b, 21c and the battery 42, the charge and discharge control circuit 13 can control not only the display state of the LEDs 52, 53, 54 but also the electric source to be fed to the theft informing signal transmitter 16.

Furthermore, in the present embodiment, the solar cells 21a, 21b are housed in the solar panel modules 12a, 12b. The solar panel modules 12a, 12b include the starting-side connectors 22a, 23a and the terminal-side connectors 22b, 23b, which are electrically connected with the solar cells 21a, 21b, respectively. The charge and discharge control circuit 13 is housed in the control module 14, which includes the first connector 31 and the second connector 32 which are electrically connected with the charge and discharge control circuit 13. The first connector 31 of the control module 14 is detachably connected with the starting-side connector 22a of the solar panel module 12a, while the second connector 32 of the control module 14 is detachably connected with the theft informing signal transmitter 16. As a result, the electromotive force from the solar cells 21a, 21b is fed to the theft informing signal transmitter 16 via the charge and discharge control circuit 13.

In this case, only by connecting the starting-side connector 22a of the solar panel modules 12a with the first connector 31 of the control module 14 and the second connector 32 of the control module 14 with the theft informing signal transmitter 16, the electromotive force from the solar cells 21a, 21b can be fed to the theft informing signal transmitter 16. Besides, if needed, a different solar panel module can be easily connected with the charge and discharge control circuit 13.

Moreover, in the present embodiment, the theft informing signal transmitter 16 is provided in the vehicle 1, while the solar panel modules 12a, 12b and the control module 14 are provided in the vehicle body cover 2 for covering the vehicle 1.

In this case, by disconnecting the second connector 32 of the control module 14 and the connector 41 of the theft informing signal transmitter 16, the vehicle body cover 2 covering the vehicle 1 can be dismounted at once without being subjected to the electric interference due to the photovoltaic power generation system 11.

Besides, in the present embodiment, the photovoltaic power generation system 11 is equipped with the terminator 15 detachably connected with the terminal-side connector 23b of the solar panel module 12b. Accordingly, with the solar panel module 12a and the control module 14, the control module 14 and the theft informing signal transmitter 16, which are connected with each other, respectively, when the terminator 15 is connected with the terminal-side connector 23b of the solar panel module 12b, the electric pathway is formed which circulates from the theft informing signal transmitter 16 to the terminator 15 via the control module 14 and the solar cells 21a, 21b in sequence. Therefore, if having detected the disconnection of the electric pathway, the theft informing signal is delivered to the antitheft security system 30.

This achieves an effect capable of issuing a security alert before a suspicious individual accesses the vehicle body, since the theft informing signal is delivered from the theft informing signal transmitter 16 to the antitheft security system 30 at the instant of having disconnected the second connector 32 of the control module 14 and the connector 41 of the theft informing signal transmitter 16 from each other for the purpose of removing the vehicle body cover 1 from the vehicle 2.

Further, in the present embodiment, the photovoltaic power generation system 11 is equipped with two or more solar cell modules. By connecting the terminal-side connector of one solar cell module and the starting-side connector of the other solar cell module with each other, the solar cells are electrically parallel-connected. In this case, originally, only by connecting the removable terminal-side connector 23a of one solar cell module 12a and the removable starting-side connector 22b of the other solar panel module 12b with the terminator 15 and the first connector 31 of the control module 14, respectively, the two solar cells 21a, 21b can be easily parallel-connected without uselessly increasing the connections of the solar panel module 12a, 12b.

Furthermore, in the present embodiment, by lighting or flickering the LEDs 52, 53, 54 full-time, the LEDs 52, 53, 54 are allowed to light or flicker even in the nighttime, thus enabling an antitheft effect to be achieved.

Embodiment 2

Next is a description of a preferred second embodiment on the cover for a solar cell panel proposed by the present invention. FIG. 10 to FIG. 16 all show a solar panel module 101 corresponding to the forgoing solar cell modules 12a, 12b. In each of these figures, numeral symbol 102 a bendable, flexible, platy and sheet-like solar cell panel and a pair of conductive lead wires 103 extend from one side of the solar cell panel 102. The solar cell module 101 in the present embodiment has a structure in which the solar cell panel 102 is sandwiched to be protected by a transparent cover 105 produced by molding a resin material such as polycarbonate (PC) or the like and a flexible elastic cover 106.

A cover 107 acting as an outer chassis of the solar cell module 101 (corresponding to the foregoing module main body 71) has an approximately hexahedral, flat and boxy shape and is formed with the transparent cover 105 on its top face and with the elastic cover 106 on its bottom and each of its lateral sides, other than the top face. An inside of the cover 107 houses a printed-circuit board 108 and a basal end of a leading cable 109.

In the leading cable 109, a male coupler 112 and a female coupler 113 (corresponding to the foregoing connectors 22a, 22b) are connected with a basal end and leading end of the cable 111 created by bundling a plurality of core wires. The male coupler 112 is connected with a female coupler 114 fitted on the printed-circuit board 108. The leading ends of the conductive lead wires 103 are connected with the printed circuit board 108, e.g., by soldering. The electromotive force from the solar cell panel 102 can be supplied to the outside of the solar cell module 101 from the leading cable 109 via the printed circuit board 108.

Other than this, a different male coupler 117 (corresponding to the foregoing connectors 23a, 23b) is mounted on the printed-circuit board 108 in its exposed state from the concave bottom 116 formed in the cover 107, eventually in the elastic cover 106. The bottom 116 of the elastic cover 106 is formed with an opening 118 passed through by the leading cable 109, and the male coupler 117 is arranged adjacently to the opening 118. Then, when a female coupler 113 of a different solar cell module 101 is coupled to this male coupler 117 to connect a plurality of the solar cell modules 101 in line, a parallel circuit is formed in each of the solar cell panels 102 and thereby larger electromotive force can be supplied from a plurality of the solar cell modules 101 to the outside. Besides, in consideration of fixing the cover 107 to a horizontal surface, each of the solar cell modules 101 is structured so that the male coupler 117 or the like does not protrude from the bottom of the cover 107.

The transparent cover 105 corresponds to the platy non-flexible transparent member and is equipped integrally with a transparent section 121 opposed to a light receiving surface, here being a surface of the solar cell panel 102 and a parts mounting concave section 122 present on one side of the transparent section 121. Thus, sunlight is allowed to irradiate the light receiving surface of the solar cell panel 102 through the transparent section 121. The backside of the parts mounting section 122 is formed integrally with an elastic holder (not shown) and by inserting the printed-circuit board 108 into the holder, the printed-circuit board, together with the leading cable 109, is fixed to the transparent cover 105. Then, the transparent cover 105, acting as a lid for water-tightly covering an upper opening of the elastic cover 106 that is bottomed, is fitted into the elastic cover 106.

The elastic cover 106 is formed by integrating the bottom 116 from which the leading cable 109 is extracted through the opening 118 to the outside of the cover 107 and a sidewall 131 provided in such a manner as to stand from the marginal portion of the bottom 116. An outside face of the bottom 116 forms a bottom surface of the cover 107, while an outside face of the sidewall 131 forms each lateral side of the cover 107.

The elastic cover 106 is produced by molding integrally a bottom 116 from which the leading cable 109 is extracted to the outside of the cover 107 via the opening 118 and a sidewall 131 provided in such a manner as to stand up from the marginal portion of the bottom 116. Then, the outside of the bottom 116 forms the bottom of the cover 107, while the outside of the sidewall 131 forms each side.

Figure 15:
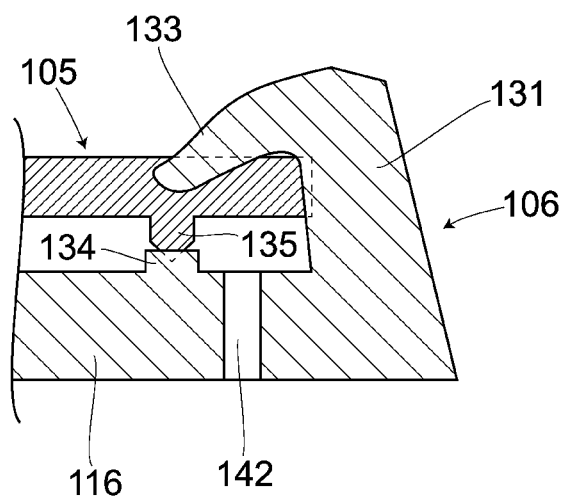
FIG. 15 is a cross-sectional view of a principal part just after an elastic cover is molded, illustrating the second embodiment of the present invention.
Figure 16:
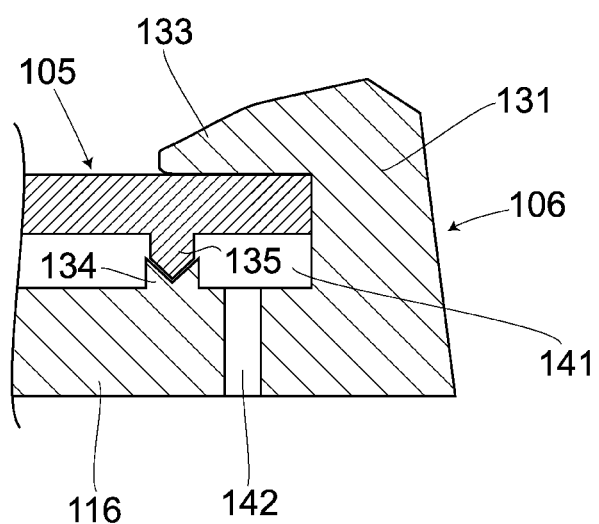
FIG. 16 is a cross-sectional view of a principal part in a state where the elastic cover is fitted into the transparent cover, illustrating the second embodiment of the present invention.

Next is a detailed description of a fitting structure of the transparent cover 105 and elastic cover 106 with reference to FIG. 15 and FIG. 16. FIG. 15 shows a shape just after the elastic cover 106 has been molded and in this state, the transparent cover 105 is not yet fitted into the elastic cover 106. Contrarily, FIG. 16 shows a state where the transparent cover 105 has been fitted into the elastic cover 106 to fix the both together.

In each of these figures, the sidewall 131 of the elastic cover 106 is formed with a lip 133 from an upper end to an inside of the elastic cover 106 in a protruding manner. This lip 133 is thinner than the bottom 116 and the sidewall 131 and is much more elastic. A protruding receiving portion 134 is formed oppositely to the extremity of the lip 133 in the inside surface of the bottom 116 of the elastic cover 106. The receiving portion 134 is adjacent to a wedge-shaped protrusion 135 formed on the underside of the transparent cover 105. The sidewall 131 and the lip 133 are formed over an entire circumference of the lateral side of the cover 107 with no space left, while the receiving portion 134 opposed to the lip 133 and the protrusion 135 pressing against the receiving portion 134 are also formed in the same way.

In the structure described above, starting with the state shown in FIG. 15, the marginal portion of the transparent cover 105 is inserted from between the lip 133 and receiving portion 134 of the elastic cover 106 to a position where the lateral side of the transparent cover 105 butts the inside surface of the sidewall 131. Then, as shown in FIG. 16, the upper surface of the periphery of the transparent cover 105 pushes up and thereby the lip 133 follows a pressure change due to the elasticity of the lip 133 itself to come in close contact with the upper surface of the periphery of the transparent cover 105. As a result, the protrusion 135 of the transparent cover 105 presses the receiving portion 134 of the elastic cover 106 and thereby the receiving portion 134 follows a pressure change due to the elasticity of the receiving portion 134 itself to come in close contact with the protrusion 135 of the transparent cover 105 and further the lateral side of the transparent cover 105 presses the inside surface of the sidewall 131 of the elastic cover 106 and thereby the sidewall 131 follows a pressure change due to the elasticity of the sidewall 131 itself to come in close contact with the lateral side of the transparent cover 105. At this time, the lip 133 of the elastic cover 106 is formed in length longer than a periphery into which the transparent cover 105 is fitted. Hence, the elastic cover 106 can be allowed to unfailingly come in close contact with the periphery of the transparent cover 105. Further, on the lower side of a position where the lip 133 contacts with the transparent cover 105, the receiving portion 134 of the elastic cover 106 contacts closely with the protrusion 135 of the transparent cover 105 to sandwich the transparent cover 105 from the upper and lower sides thereof. Hence, the close contact condition of the lip 133 abutting against the upper surface of the transparent cover 105 for which waterproof performance is particularly required and the water-stopping performance inside the cover 107 become feasible at the same time.

As shown in FIG. 16, with the transparent cover 105 fitted into the elastic cover 106, a water-tight watertight drainage channel 141 is formed by being surrounded with the bottom 116 of the elastic cover 106 and the sidewall 133, the marginal portion of the transparent cover 105, the protrusion 135 of the transparent cover 105 and the receiving portion 134 of the elastic cover 106. Further, on the bottom 116 of the elastic cover 106, in communication with this drainage channel 141, a drainage hole 142 for draining off liquid (water) from the drainage channel 141 to the outside of the cover 107. Both of the drainage channel 141 and the drainage hole 142 are located outside the receiving portion 134 and the protrusion 135 which are in close contact with each other to enable water to be prevented from being sucked in and then to be drained, by means of a pumping effect. By realizing the water-stopping structure of the cover 107 like this, more secure waterproof performance can be maintained inside the cover 107.

Further, as shown in FIGS. 6, 7 described above, the forgoing solar cell module 101 is mounted on the vehicle body cover 1 as the solar panel modules 12a, 12b. The vehicle body cover 1 is folded sometimes depending on the situation and hence must be formed from a flexible material. In this case, the transparent cover 105 is not flexible and the cover 106 is substantially rigid and therefore when the vehicle body cover 1 is folded, the cover should be stuck.

Furthermore, the solar cell module 102 containing the solar cell panels, different from the usual stationary usage state of solar cells, is taken out of the housing section 61 depending on the sun direction in addition to the need for dismounting and mounting the vehicle body cover 1 itself every time one travel finishes, thus being required for frequent and repeated dismounting and mounting operations. The cover 107, however, is equipped with the water-stopping structure described above, thus permitting the waterproof performance to be enhanced for the solar cell module.

In the present embodiment as described above, the cover 107, which houses the solar cell panel 102 and has the sunlight transmission property and waterproof performance, includes the elastic cover 106 serving as a flexible member produced by forming integrally five sides of the cover 107 having the form of a substantial hexahedron and the transparent cover 105 serving as a transparent plate member which forms one remaining side of the cover 107 and is fitted into the elastic cover 106.

Accordingly, no heat is required which is usually used for bonding, welding, screw fastening, or integral molding, in the assembling process of the cover 107. Then, only by fitting the transparent cover 105 into the elastic cover 106, it becomes possible to realize more secure waterproof performance of the elastic cover 106 for the solar cell panel 102 with the elastic cover 106 ensured in flexibility. In this case, a structure with a small number of components (the minimal number of the components is two) can be realized due to using the transparent cover 105 and the elastic cover 106 for forming the cover 107 as well as making it possible to simplify the management of the assembling process of the cover 107.

Moreover, by forming the transparent cover 105 from a bendable material, the cover 107 produced by combining the transparent cover 105 and the elastic cover 106 can be appropriately bent with its waterproof performance maintained.

Further, according to the present embodiment, the elastic cover 106 comprises the bottom 116 with the receiving portion 134 protruding toward the transparent cover 105 and the sidewall 131 serving as a lateral portion with the lip 133 which stands up from the marginal portion of the bottom 116 and is opposed to the receiving portion 134. The protrusion 135 is formed adjacently to the receiving portion 134 on the underside of the transparent cover 105. Then, the lip 133 abuts against the upper side of the transparent cover 105 to elastically deform while the receiving portion 134 abuts against the protrusion 135 to deform, resulting in the formation of the structure where the transparent cover 105 is fitted into the elastic cover 106.

Thus, on the lower side of the position where the lip 133 contacts with the transparent cover 105, the receiving portion 134 of the elastic cover 106 contacts closely with the protrusion 135 of the transparent cover 105 to sandwich the transparent cover 105 from the upper and lower sides thereof. Hence, the keeping of the close contact condition of the lip 133 abutting against the upper surface of the transparent cover 105 for which waterproof performance is particularly required and the water-stopping performance inside the cover 107 become feasible at the same time.

Besides, in the present embodiment, the sidewall 131 of the elastic cover 106 abuts against the lateral side of the transparent cover 105 to elastically deform and thereby the drainage channel 141 watertight is formed outside the receiving portion 134 and the protrusion 135 which are in close contact with each other and besides the drainage hole 142 communicating with the drainage channel 141 is formed on the bottom 116 of the elastic cover 106. Hence, these drainage channel 141 and drainage hole 142 enable water to be prevented from being sucked in and to be drained, by means of a pumping effect, permitting more secure waterproof performance inside the cover 107 to be maintained.

Further, if the functions resulting from the drainage channel 141 and drainage hole 142 are dispersed into a plurality of positions to enable a water-stopping operation to perform, the secure waterproof performance can be maintained even if the rigidities of the transparent cover 105 and elastic cover 106 are low, leading to the manufacturing advantage of allowing an undercut to be narrowed at the time of molding.

In addition, the present invention is not limited to the present embodiment and various modifications are possible within the scope of the gist of the present invention. For example, the number of the LEDs 52, 53, 54 may be two or more without putting limitations on the number, and a plurality of colors may be switched by a single LED with luminous elements each emitting a light beam different in color. In this case, by means of a flickering pattern of at least one luminous element lighting among a plurality of luminous elements, the remaining level of the battery 42 and the electricity generated by the solar cells 21a, 21b, 21c can be displayed. By employing LEDs as a display unit, the electric power consumption attributable to the display unit can be reduced. Besides, by varying a flickering pattern of at least one luminous element selected from among a plurality of the luminous elements, making up a single LED, each emitting a light beam different in color, a display form sensuously easy to view can be realized.

Then, in this case, only one luminous element among a plurality of the luminous elements is desirably allowed to individually light. Specifically, only one luminous element selected from a plurality of the luminous elements each emitting a light beam different in color is allowed to vary in flickering pattern to minimize the number of luminous elements allowed to light and the luminescent duration thereof, thereby enabling the electric power consumption attributable to the display unit to be minimized.

Further, depending on the electricity generated by the solar panel modules 12a, 12b, 12c, an LED selected from among the LED 52, 53, 54 is replaced and depending on the charged amount of the battery 42, a selected LED, e.g., the LED 53 may be varied in flickering interval.

Further, the fitting structure between the transparent cover 105 and the elastic cover 106 is not limited to one showed in the present embodiment and various modifications may be appropriately possible without departing the gist of the present invention. Besides, both the transparent cover 105 and the elastic cover 106 may be formed from a flexible material.

What is claimed is:

1. A photovoltaic power generation system to charge a battery of a vehicle, including solar cells for feeding an electromotive force to said battery, comprising:
    a display unit to make a remaining level of said battery and an electricity generated by said solar cells visible; and
    a charge and discharge control circuit for controlling a display state of said display unit,
    wherein said display unit comprises a plurality of luminous elements each configured to emit a light beam different in color, while said charge and discharge control circuit is configured to control said display unit so that depending on the remaining level of said battery, at least one luminous element from among the plurality of luminous elements is selected to be lit, and a flickering interval of the selected at least one luminous element is varied depending on the electricity generated by said solar cells.

2. The photovoltaic power generation system according to claim 1, wherein said display unit comprises a plurality of LED units each having a different luminescent-color element corresponding to the plurality of said luminous elements.

3. The photovoltaic power generation system according to claim 2, wherein only one LED unit selected from among the plurality of said LED units is lighted individually.

4. The photovoltaic power generation system according to claim 1, wherein said display unit comprises a single LED unit composed of the plurality of said luminous elements.

5. The photovoltaic power generation system according to claim 4, wherein only one luminous element selected from among the plurality of said luminous elements is lighted individually.

6. The photovoltaic power generation system according to claim 1, further comprising:
    at least one solar cell panel for housing said solar cells therein; and
    at least one solar cell pocket provided in a cover for covering said vehicle, the number of said solar cell pockets being not less than that of said solar cell panels.

7. The photovoltaic power generation system according to claim 6, wherein an interval between adjacent edges of said solar cell pockets is equal to or more than twice the thickness of said solar cell panel.

8. The photovoltaic power generation system according to claim 1, further comprising a signal transmitter for delivering a state signal of said photovoltaic power generation system to a security device of said vehicle.

9. The photovoltaic power generation system according to claim 8, wherein said charge and discharge control circuit controls which of said solar cells and said battery, serving as an electric source, feeds electric power to said signal transmitter.

10. The photovoltaic power generation system according to claim 9, further comprising:
a solar cell panel for housing said solar cells therein, said solar cell panel including a starting-side connector and a terminal-side connector that are electrically connected with said solar cells; and
a control module for housing said charge and discharge control circuit therein, said control module including a first connector and a second connector that are electrically connected with said charge and discharge control circuit,
wherein said first connector of said control module is detachably connected with said starting-side connector of said solar cell panel, while said second connector of said control module is detachably connected with said signal transmitter, so that an electromotive force from said solar cells is fed to said signal transmitter via said charge and discharge control circuit.

11. The photovoltaic power generation system according to claim 10, wherein said signal transmitter is provided in said vehicle, while said solar cell panel and said control module are provided in a cover for covering said vehicle.

12. The photovoltaic power generation system according to claim 11,
further comprising a terminator removably connected with said terminal-side connector of said solar cell panel,
wherein there is formed an electric pathway which circulates from said signal transmitter to said terminator via said control module and said solar cells in sequence by connecting said terminator with said terminal-side connector of said solar cell panel in a state where said solar cell panel and said control module, and, said control module and said signal transmitter, are electrically connected with each other, and
wherein said signal transmitter delivers said state signal to a security device of said vehicle when an interruption of said electric pathway is detected.

13. The photovoltaic power generation system according to claim 12, wherein said solar cell panel is at least two so that said solar cells are electrically connected in parallel by connecting said terminal-side connector of one of said at least two solar cell panels with said starting-side connector of an other of said at least two solar cell panels.

14. The photovoltaic power generation system according to claim 13, wherein said display unit is allowed to be lighted or flicker full-time.

15. The photovoltaic power generation system according to claim 1, further comprising a cover which houses said solar cells and has sunlight transmission property and waterproof property, said cover being made up of a flexible member produced by integrally molding five faces of said cover having a substantially hexahedron shape and a transparent plate member which forms one face of said cover and is fitted into said flexible member.

16. The photovoltaic power generation system according to claim 15, wherein said flexible member is made up of a bottom with a receiving portion protruding toward the transparent member and a lateral side which stands up from a marginal portion of said bottom and has a lip opposed to said receiving portion, while said transparent member is formed on an underside thereof with a protrusion facing said receiving portion, and
wherein said lip abuts against an upper surface of said transparent member to elastically deform while said receiving portion abuts against said protrusion to elastically deform, thereby fitting the transparent member into the flexible member.

* * * * *